United States Patent [19]

Loosemore et al.

[11] Patent Number: 4,481,811
[45] Date of Patent: Nov. 13, 1984

[54] MEASUREMENT OF FLUID OSCILLATION AMPLITUDE

[75] Inventors: William R. Loosemore, Abingdon; Roger D. Watkins, Wantage; Colin L. Desborough, Faringdon, all of England

[73] Assignee: British Nuclear Fuels Limited, Warrington, England

[21] Appl. No.: 477,308

[22] Filed: Mar. 21, 1983

[30] Foreign Application Priority Data

Apr. 5, 1982 [GB] United Kingdom ............... 8210053

[51] Int. Cl.³ ............................................. G01F 15/00
[52] U.S. Cl. ................................... 73/198; 73/432 R
[58] Field of Search .................... 73/170 A, 861, 198, 73/654, 658, 432 R, 432 V

[56] References Cited

U.S. PATENT DOCUMENTS

| 3,113,285 | 12/1963 | Edwards | 73/170 |
| 3,292,426 | 12/1966 | McCann | 73/658 |
| 3,301,048 | 1/1967 | Felsenthal, Jr. | 73/170 |
| 3,769,838 | 11/1973 | Buckler | 73/170 |

FOREIGN PATENT DOCUMENTS 821918  9/1981  U.S.S.R. ............................... 73/170

Primary Examiner—Herbert Goldstein
Attorney, Agent, or Firm—William R. Hinds

[57] ABSTRACT

The invention provides ultrasonic apparatus 64 for measuring the amplitude of oscillation of a fluid. The apparatus 64 combines an ultrasonic flowmeter 60, 62, 65 which gives an indication of velocity of the fluid, with an integrating circuit 74. The integration is carried out over successive half-cycles of the oscillation, and may be arranged to give an average value of the amplitude.

1 Claim, 4 Drawing Figures

MEASUREMENT OF FLUID OSCILLATION AMPLITUDE

The invention relates to ultrasonic methods for measuring the amplitude of oscillation of a fluid, within for example a chemical plant.

A technique which can be used in the case of a liquid for the above purpose involves the determination of the position of a liquid/gas interface by a time of flight measurement, reflecting an ultrasonic beam from the interface. Although this technique often is applicable, it will not give accurate results if the interface is disturbed by rapid movement or by the formation of bubbles, nor is it applicable in situations where the liquid level oscillates in a pipe which is not straight. Instruments also are known for measuring the velocity of flow of a fluid by ultrasonic techniques, as described for example in GB Pat. No. 1,508,636.

An object of the present invention is to provide an instrument with which the amplitude of oscillations of a fluid can be determined, the operation of which is not affected by the state of a fluid interface.

According to the present invention there is provided an apparatus for measuring the amplitude of oscillations of a fluid comprising, a first transducer and a second transducer spaced apart relative to a direction in which oscillatory fluid flow occurs, each transducer being adapted to transmit and receive pressure wave pulses through the fluid, means connected to the transducers for energizing the transducers, means for detecting pressure wave pulses received by the transducers, means for determining from the detected pulses the velocity of flow of the fluid and for producing a signal representative of the velocity, and means for integrating the velocity signals with respect to time so as to determine the amplitude of oscillation of the fluid.

The invention will now be described with reference to the accompanying drawings, in which.

Figure 1:
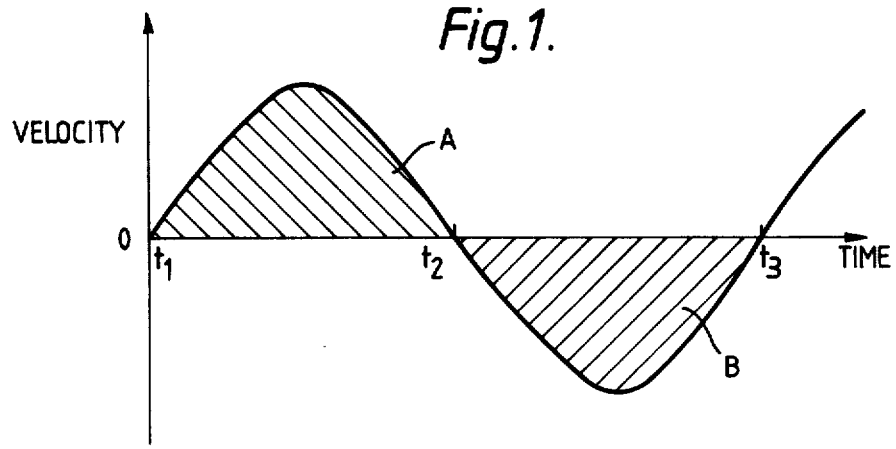
FIG. 1 is a graphical representation of the variation of fluid velocity with time in the case of an oscillating fluid column.

Referring now to FIG. 1 which is a graph showing the variation with respect to time of the velocity of a fluid undergoing an oscillatory motion. The fluid is instantaneously stationary at times $t_1$, $t_2$ and $t_3$. The fluid travels in one direction, designated positive, between the times $t_1$ and $t_2$, reaching its maximum positive displacement at the time $t_2$, and it travels in the negative direction between the times $t_2$ and $t_3$, reaching its maximum negative displacement at the time $t_3$. The total distance travelled by the fluid in the positive direction is equal to the area A between the velocity curve and the time axis between $t_1$ and $t_2$, and the total distance travelled by the fluid in the negative direction is equal to the area B between the velocity curve and the time axis between $t_2$ and $t_3$. If the fluid is oscillating with a constant amplitude, then the area A will be numerically equal to the area B, while if the amplitude is increasing, the area B will be numerically greater than the area A. Using mathematical notation to express this relationship, if the velocity of the fluid at a time t is equal to v, then the distance s travelled by the fluid is in general given by:

$$s = \int v \, dt$$

Hence, if means are provided for measuring the velocity of the fluid (i.e. its speed and its direction of flow), then the total distance travelled by the oscillating fluid between one extreme position in its oscillations and the other may be determined by integrating the velocity between successive instants of time at which the velocity changes sign. This distance is referred to herein as the "total displacement" of the fluid, and for a sinusoidal oscillation is equal to twice the amplitude.

Figure 2:
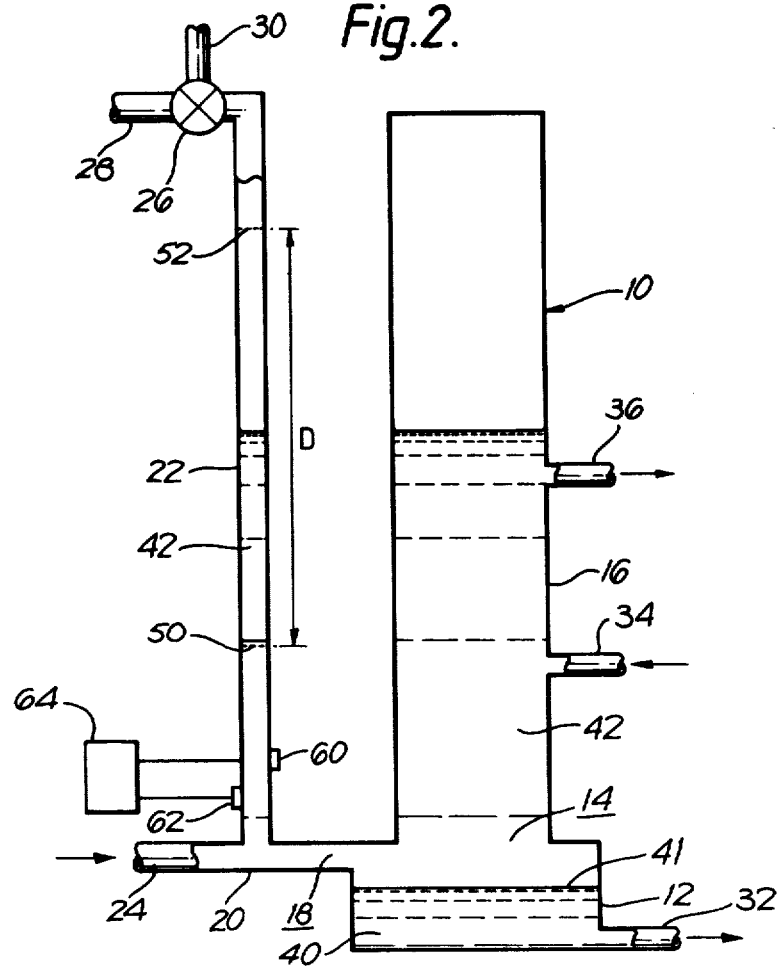
FIG. 2 shows a representation of an embodiment of the invention installed in a pulse separation column.

Referring to FIG. 2, which shows an apparatus in which an instrument embodying the present invention is installed, a pulse separation column 10 includes a mixing tank 12 having an upper port 14 which communicates with a vertically extending separation limb 16, and a lower port 18 which communicates through a cross-limb 20 with a vertically extending pulse limb 22 the diameter of which is much less than that of the separation limb 16, and also with an inlet pipe 24. The upper end of the pulse limb 22 communicates through a two-way valve 26 with an air line 28 which is connected to a supply of compressed air (not shown), and with an air line 30 maintained at atmospheric pressure. An outlet pipe 32 is connected to the base of the mixing tank 12. An inlet pipe 34 is connected to the separation limb 16, and an outlet pipe 36 is connected further up the separation limb 16.

In use of the pulse separation column 10, an aqueous solution 40 is pumped into the separation limb 16 through the inlet pipe 34, falls down into the mixing tank 12 and flows out of the outlet pipe 32. At the same time a solvent liquid 42 of lower density is pumped into the mixing tank 12 through the inlet pipe 24, and flows out of the separation limb 16 through the outlet pipe 36.

By means of the two-way valve 26, the liquid 42 in the pulse limb 22 is subjected to pulses of high pressure air so as to make the level of the liquid 42 in the pulse limb 22 oscillate between extreme positions 50 and 52, thereby ensuring that the interface 41 between the aqueous solution 40 and the solvent liquid 42 in the mixing tank 12 is turbulent, and that the liquid 42 in the separation limb 16 is thoroughly agitated.

Figure 3:
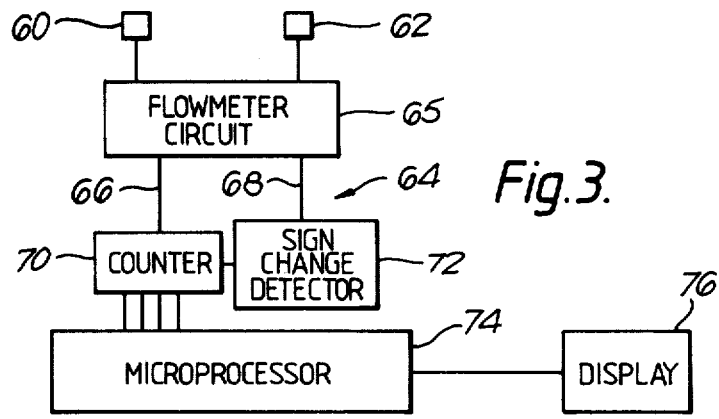
FIG. 3 shows a block diagram of electronic circuitry which forms part of an embodiment of the invention.

The total displacement D of the liquid 42 is monitored by an instrument embodying the present invention, comprising two ultrasonic transducers 60 and 62 mounted on the wall of the pulse limb 22, and an associated electronic circuit 64 shown in more detail in FIG. 3 to which reference is now made.

The electronic circuit 64 comprises a flowmeter circuit 65 having two outputs, one output 66 providing a stream of pulses the frequency f of which is proportional to the liquid speed v, the other output 68 signifying the direction of flow of the liquid 42. The output 66 is connected to a counter 70 and the output 68 is connected to a sign change detector 72 which detects any change in the direction of flow. The output signal from the sign change detector 72 is used to control the counter 70, which is connected to a microprocessor 74, such that when the flow direction changes sign the counter 70 sends a signal to the microprocessor 74 representing the total number of pulses received, P, and the counter 70 is reset to zero. The signals received by the microprocessor 74 thus represent the numbers P of pulses from the output 66 of the flowmeter 65 in consecutive half-cycles of the oscillation of the liquid 42. The microprocessor 74 is arranged to calculate the average number of such pulses, over a predetermined number of half-cycles, from which it calculates the average value of the total displacement D of the liquid 42, and this value is displayed by a display means 76. Alternatively, the microprocessor 74 may be arranged to calculate the amplitude of the oscillation, which is half the total displacement D. In this case the display means 76 may display the value of the amplitude.

Since, as stated above, the pulse frequency f is proportional to the liquid speed v, i.e. f=kv where k is a constant, and since in a short length of time $\Delta t$, the number of pulses received by the counter is given by: $f \times \Delta t$, it follows that the number P of pulses received during a half cycle of the oscillation is directly proportional to the total displacement D:

$$P = \Sigma_1{}^1 f \times \Delta t = \Sigma_1{}^1 kv \times \Delta t = k\Sigma_1{}^1 v\Delta t = kD$$

Hence $D=P \div k$, so the total displacement D is readily calculated from the total number of pulses, P, and as explained above the amplitude of the oscillation is equal to half the total displacement D.

Figure 4:
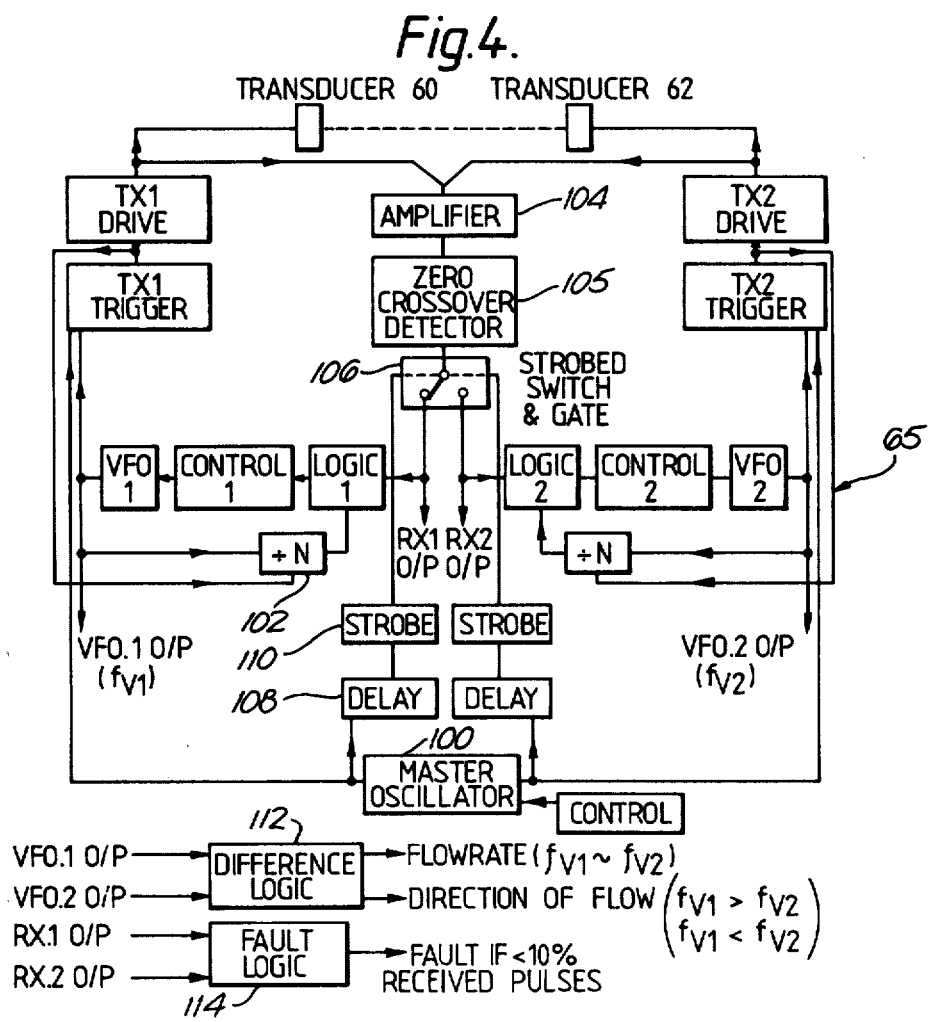
FIG. 4 shows a portion of the block circuit diagram of FIG. 3 in greater detail.

The flowmeter circuit 65 may be of any suitable design and in FIG. 4 is shown one such design, further details of which may be found in British Pat. No. 1,508,636. The ultrasonic transducers 60 and 62 are arranged spaced apart so as to transmit pressure wave pulses through the liquid along the direction in which the velocity of liquid flow is to be measured.

It is convenient to describe the mode of operation of the circuit of FIG. 4 for one transmission direction, the opposite direction being similar.

A master oscillator 100 provides a train of "start" pulses whose period is conveniently some 10% or 20% longer than (L/c), where L is the distance between the transducers 60 and 62, and c is the velocity of sound in the liquid. The "start" pulses are applied to each of the triggers TX1 and TX2, the pulses to trigger TX2 being displaced in time relative to the pulses to trigger TX1 to avoid clash of receive and transmit pulses at the transducers.

A pulse from the master oscillator 100 enables the TX1 trigger, which triggers a drive circuit TX1 upon the next pulse from a voltage controlled variable frequency oscillator VFO1. The output from the trigger TX1 also resets a $\div N$ counter 102 (where N is a predetermined number). The resulting pulse of ultrasound travels through the liquid from the transducer 60 to the transducer 62. The received pulse is routed to an amplifier 104 and an accurate time reference is established upon this received pulse by a zero-crossover detector 105.

The output from the zero-crossover detector 105 is fed via a strobed switch and gate 106 to a logic 1 circuit and a control 1 circuit. The logic 1 circuit compares the time of arrival $t_1$ of the arrived pulse with the time that the Nth pulse from the oscillator VFO1 occurs. Depending upon whether the received pulse occurs before or after the Nth VFO1 pulse, the control 1 circuit is caused to make a small change in the control voltage to the oscillator VFO1 to increase or decrease its frequency respectively. After a number of transmissions the Nth VFO1 pulse will be in time coincidence with the received pulse. If the frequency of the oscillator VFO1 is then $f_{v1}$, then $$t_1 = N \times \frac{1}{f_{v1}}$$

The signal from the master oscillator 100 also controls the strobed switch and gate 106, via a delay 108 and a strobe 110. The delayed strobe signal serves both to inhibit response, except around the expected time of arrival of a received pulse, and to operate the switch and gate 106 to route the received signal to the logic 1 circuit. If no received pulse arrives in the strobe time due to an obstacle in the fluid path, this is recognised by the logic 1 circuit and no change in the VFO1 control voltage is made.

Operation for transmission from transducer 62 parallels that for transducer 60, except that the received signal from transducer 60 is routed, via the strobed switch and gate 106 to logic 2 circuit. Thus if the time of arrival of the received ultrasonic pulse is $t_2$, and the frequency of oscillator VFO2 is $f_{v2}$, then, after a number of transmissions:

$$t_2 = N \times \frac{1}{f_{v2}}$$

The outputs from the variable frequency oscillators, labelled VFO1 O/P, and VFO2 O/P, are fed to a difference logic circuit 112. The flow speed is indicated by a difference output in the form of a stream of pulses, of frequency $f=(f_{v1} \sim f_{v2})$, and the flow direction is indicated by a logic output showing whether $f_{v1} > f_{v2}$ or $f_{v1} < f_{v2}$.

If the flow speed is v, then the two arrival times $t_1$ and $t_2$ are given by:

$$\frac{L}{c+v} \text{ and } \frac{L}{c-v}$$

for the downstream and upstream times respectively.

Thus the difference output is a pulse stream of frequency:

$$f = f_{v1} \sim f_{v2} = \frac{N}{t_1} \sim \frac{N}{t_2} = \frac{2Nv}{L}$$

which is thus directly proportional to the speed of the liquid. The constant of proportionality, k, is thus equal to (2N/L).

In the apparatus of FIG. 2, if the beam of ultrasound from the transducers 60, 62 makes an angle $\theta$ with the direction of flow of liquid 42 in the pulse limb 22 then in the above equations v is replaced by v cos $\theta$.

The received pulses from the amplifier 104 are monitored and, indicated as RX1 O/P and RX2 O/P, are fed to a fault logic circuit 114, which indicates a fault and inhibits readout if less than a present minimum percentage (typically 10%) of pulses is received. This ensures that temporary obstacles, such as bubbles, do not effect the reading of the instrument.

The instrument for measuring the total displacement of a fluid has been described in relation to an oscillating liquid but it will be understood that an instrument of this type could be used to measure the total displacement of an oscillating gas, and although described in relation to the pulse limb of a pulse separation column it can clearly be used in any situation in which oscillating fluids occur.

An advantageous feature of the instrument of the present invention is that the apparatus is non-invasive and can be used in for example a chemical plant without requiring any modification in the plant.

We claim:

1. In a chemical plant including a duct for containing a liquid which in operation of the plant is caused to oscillate along the duct, a first transducer and a second transducer spaced apart along the duct and each arranged to transmit and receive ultrasonic pressure wave pulses through the liquid; means connected to the transducers for energizing the transducers; means for detecting the pulses received by the transducers, for determining therefrom the velocity of flow of the liquid, for producing a first signal comprising a series of pulses whose frequency is directly proportional to the magnitude of the velocity, and for producing a second signal representative of the direction of flow; and a counting means arranged to be controlled by the second signal so as to count the number of pulses of the first signal between consecutive occasions at which the direction of flow changes.

* * * * *